Sept. 5, 1967　　　　　D. T. AYERS, JR　　　　　3,339,679
AUTOMATIC BRAKE ADJUSTER
Filed July 14, 1966　　　　　　　　　　　　　3 Sheets-Sheet 1

INVENTOR.
David T. Ayers, Jr.
BY
Harness, Dickey & Pierce.
ATTORNEYS

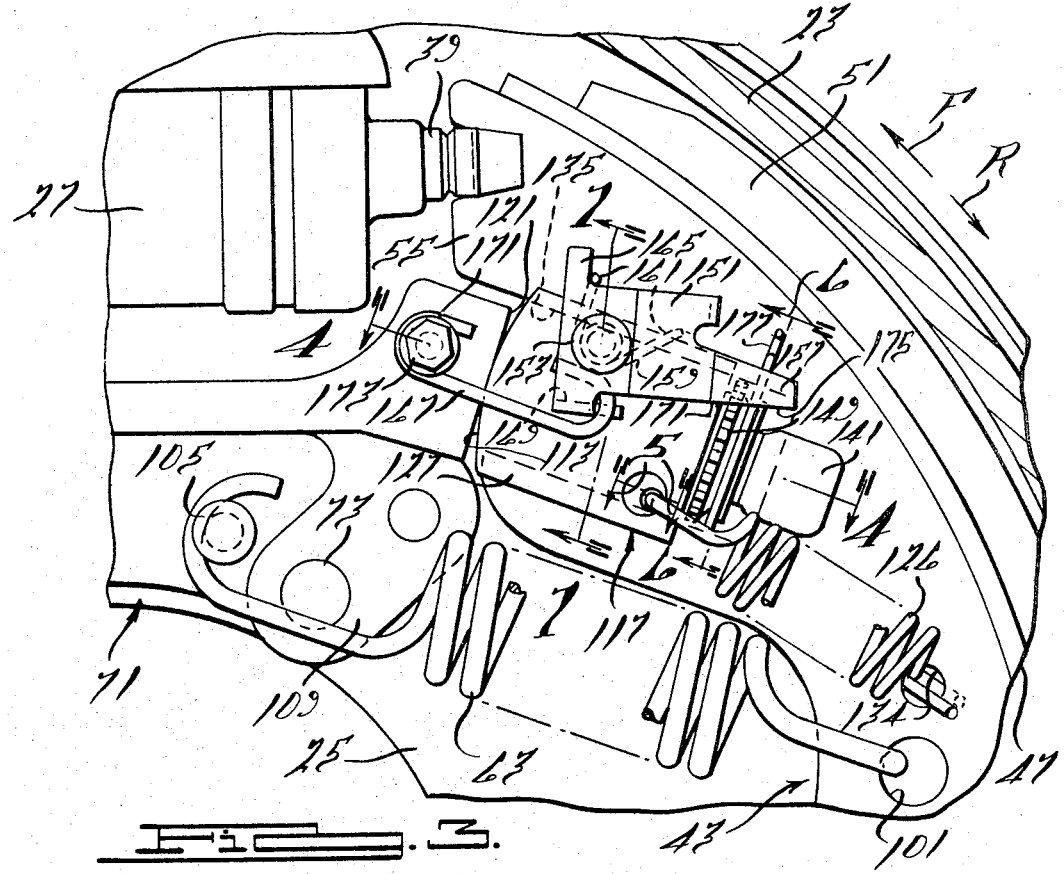
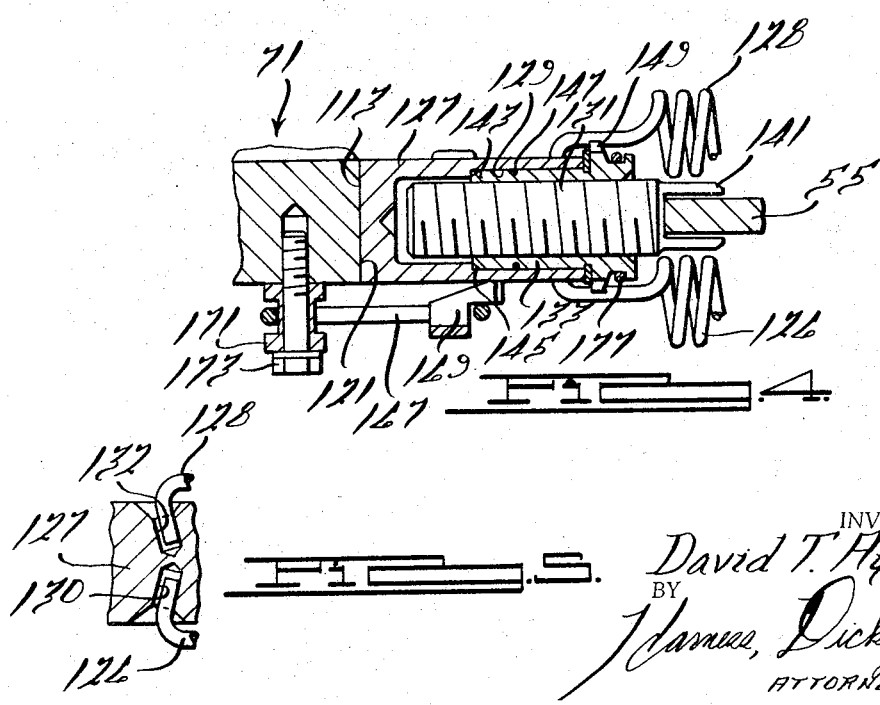

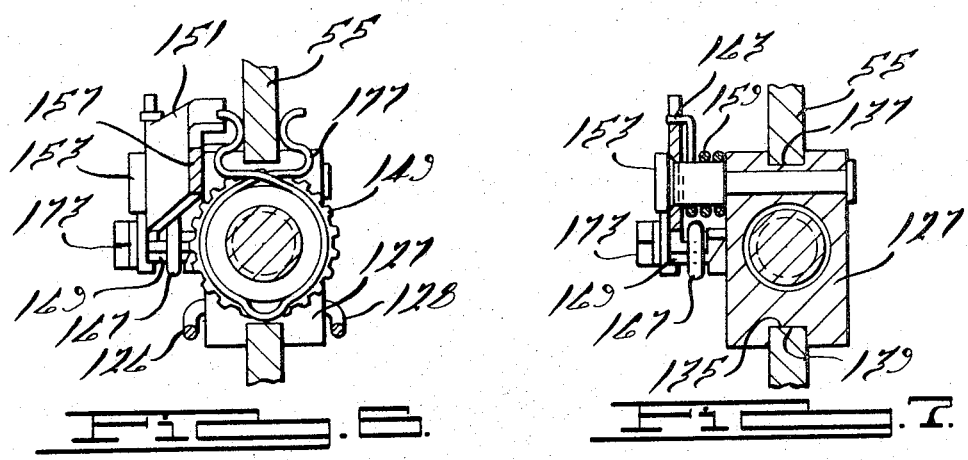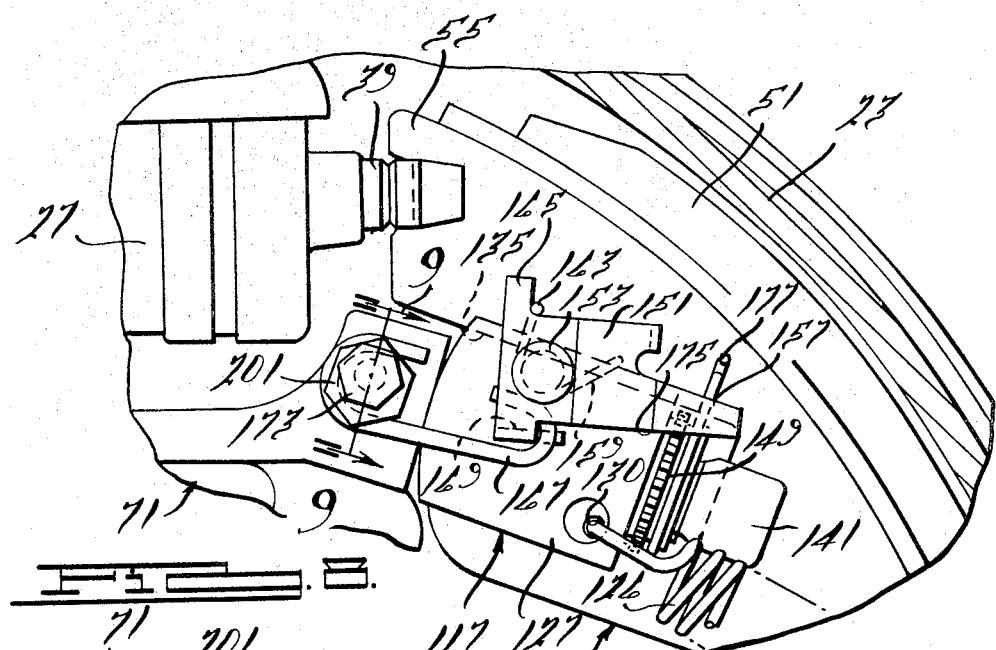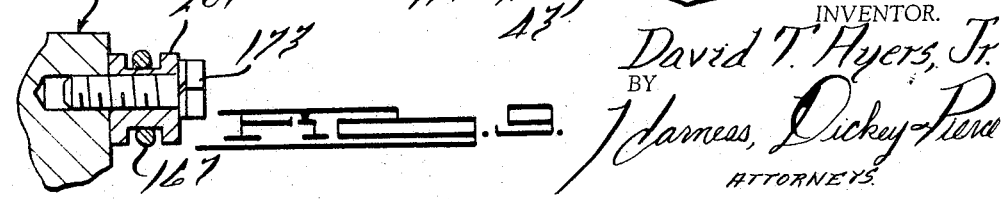

United States Patent Office 3,339,679
Patented Sept. 5, 1967

3,339,679
AUTOMATIC BRAKE ADJUSTER
David T. Ayers, Jr., Birmingham, Mich., assignor to Kelsey-Hayes Company, Romulus, Mich., a corporation of Delaware
Filed July 14, 1966, Ser. No. 565,215
10 Claims. (Cl. 188—79.5)

This invention relates generally to vehicle brakes, and particularly to an improved automatic brake adjuster for drum-type brakes.

An important object of the present invention is to provide an improved compact, positive acting brake shoe adjusting device for drum-type vehicle brakes.

Another important object of this invention is to provide an improved brake adjusting device of the above character adapted to prevent undue part stress if adjustment is not carried out.

Another important object of the present invention is to provide an improved brake adjusting device of the above character which is adapted for use with drum brakes which employs a floating or shifting anchor for the brake shoes.

Another object of the present invention is to provide an improved brake adjusting device of the above character which is operative during reverse vehicle movement and does not affect normal brake operation during either forward or reverse vehicle movement.

Further objects of the present invention include the provision of an automatic brake adjusting device of the above character which is relatively inexpensive to manufacture, rugged in construction and reliable in use.

Other objects and advantages of the present invention will become more apparent from a consideration of the following detailed description taken in conjunction with the drawings in which:

FIG. 3 is an enlarged view of a portion of FIG. 1 taken within the enclosure "3" therein;

FIG. 4 is a sectional view of FIG. 3 taken along the line 4—4 thereof;

FIG. 5 is a sectional view of FIG. 3 taken along the line 5—5 thereof;

FIG. 6 is a sectional view of FIG. 3 taken along the line 6—6 thereof;

FIG. 7 is a sectional view of FIG. 3 taken along the line 7—7 thereof;

FIG. 8 is a view, similar to FIG. 3, illustrating a modified form of the invention; and FIG. 9 is a sectional view of FIG. 8 taken along the line 9—9 thereof.

Figures 1, 2:
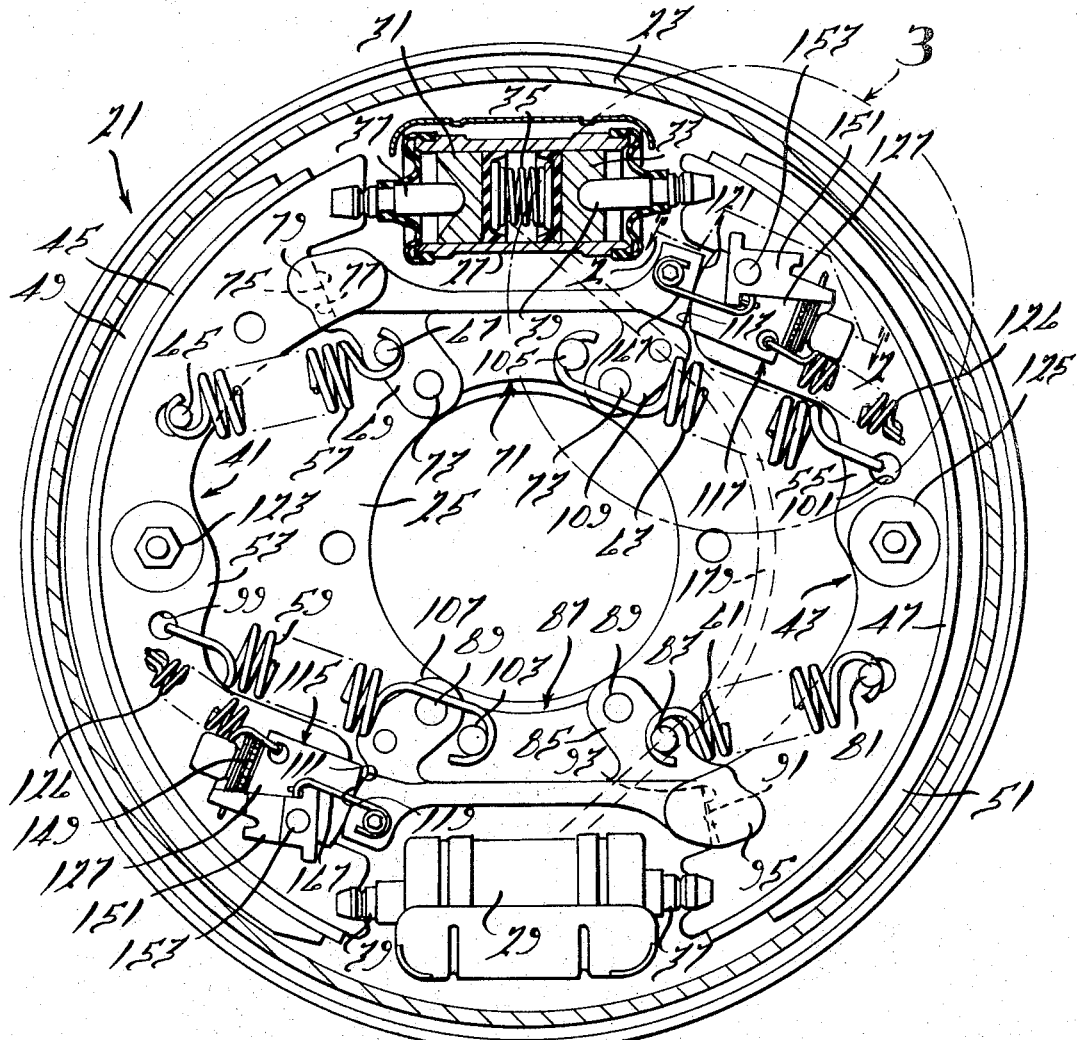
FIGURE 1 is a sectional veiw of a brake embodying a preferred form of the invention and shown with the brake shoes in the released position.
FIG. 2 is an enlarged sectional view of FIG. 1 taken along the line 2—2 thereof.

Broadly described, the present invention comprises a rotatable brake drum, a fixed torque resisting means, a brake shoe within said drum engageable with said torque resisting means and movable into engagement with said drum, variable length means carried by said brake shoe and including first and second longitudinally adjustable members engaging said torque resisting means and said brake shoe, resilient means normally biasing one of said members toward said brake shoe, lever means carried by said one member and operatively engageable with the other of said members to adjust it longitudinally relative to said one member upon movement of said lever means a predetermined amount relative to said variable length means in one direction, link means interconnecting said lever means and said torque resisting member, said link means being operable to move said lever means in said one direction relative to said variable length means and oppose the biasing force of said resilient means to elongate said variable length means upon movement of said brake shoe away from said torque resisting member.

Referring now more specifically to the drawings, a vehicle brake embodying the present invention is illustrated generally at 21 in FIG. 1 and is seen to include a brake drum 23 operatively secured to a wheel (not shown) for rotation about a central axis. A stationary backing plate 25 is fixed to a nonrotatable part of the vehicle (not shown). A pair of wheel or brake cylinders 27, 29 are fixed to the backing plate 25 and each of the cylinders has a pair of pistons 31, 33 urged apart by a light compression spring 35. The pistons 31, 33 operate plungers 37, 39 extending from opposite ends of the cylinders 27, 29.

A pair of arcuately shaped brake shoes 41, 43 are provided with rim portions 45, 47 upon which are fixed arcuate brake linings 49, 51, respectively. The rim portions 45, 47 are reinforced and supported against flexure by web portions 53, 55 extending generally perpendicular thereto. The outer ends of the plungers 37, 39 are bifurcated and engage the web portions 53, 55, as seen in FIG. 1, so that when hydraulic fluid is delivered to the cylinders 27, 29, such as from a conventional pedal operated master cylinder, the pistons 31, 33 are moved apart and press the brake linings 49, 51 into frictional engagement with the brake drum 23. The brake linings return and are normally held spaced from the brake drum 23 and against fixed torque resisting or anchor means, to be described, by tension return springs 57, 59 and 61, 63 respectively.

As seen in FIG. 1, the return spring 57 has one end hooked to a pin 65 on the brake shoe web 53 and its other end hooked to a pin 67 on an arm 69 of a torque resisting member 71 which, in turn, is fixed to the backing plate 25 by bolts 73. The spring 57 normally holds an abutment surface 75 on the brake shoe web 53 seated against an anchor surface 77 formed at the base of a slotted end 79 of the member 71. Similarly, the return spring 61 has one end hooked to a pin 81 on the brake shoe web 55 and its other end hooked to a pin 83 on an arm 85 of another torque resisting member 87 fixed to the backing pltae 25 by bolts 89. This spring 61 normally holds an abutment surface 91 on the brake shoe web 55 seated against an anchor surface 93 at the base of a slotted end 95 of the torque resisting member 87.

The springs 59, 63 have one end hooked through openings 99, 101 in the brake shoe webs 53, 55 and their other ends hooked to pins 103, 105 on arms 107, 109 on the torque resisting members 71, 87, respectively. The springs 59, 63 normally hold abutment surfaces 111, 113 of anchor members 115, 117 carried by the brake shoe webs 53, 55 seated against anchor surfaces 119, 121 on the torque resisting members 71, 87, respectively. Conventional hold-down devices 123, 125 hold the brake shoes 41, 43 in proper relation to the backing plate 25.

It will be appreciated that when the brakes are "off," the brake shoes 41, 43 seat against the fixed anchor surfaces 77, 119 and 93, 121, respectively. Thus, the radial travel of the brake shoes 41, 43 required to bring the linings 49, 51 into contact with the brake drum 23 increases as the brake linings wear. The brake pedal travel needed to effect brake energization is directly proportional to this radial travel of the brake shoes 41, 43, so that it is desirable to maintain this brake shoe travel relatively constant in order that the brake pedal travel stay within suitable limits.

To this end, each of the anchor members 115, 117 is of variable length construction so that the radial position of the brake shoes 41, 43 relative to the drum 23, when the brakes are off, can be adjusted. By selectively adjusting the length of the anchor members 115, 117, the brake pedal travel needed to energize the brakes can be held relatively constant. The anchor members 115, 117, the adjusting mechanism therefor and the mode of operation thereof are identical so that a detailed description of the anchor member 117, its adjustment and mode of operation will suffice here. It is to be understood that like numerals in the drawings refer to the parts for both anchor members 115, 117 as well as the adjusting mechanism therefor.

Turning now to FIGS. 2–7, the anchor member 117 is seen to include an anchor block 127 having an opening 129 in which is disposed a threadedly engaged shank 131 and nut 133. The anchor block 127 is slotted along its top and bottom at 137, 139 to slidably support the block 127 in a slot 135 formed in the brake shoe web 55 (FIG. 7). A pair of tension springs 126, 128 have one end received in recesses 130, 132 in the anchor block 127 and their other ends are hooked through an opening 134 in the brake shoe web 55. The springs 126, 128 normally bias the anchor block 127 toward the right as seen in FIGS. 3 and 4 and in a direction away from the anchor surface 121. As seen in FIG. 3, the outer end of the anchor block 127 is arcuately shaped to define the abutment surface 113 adapted to engage the anchor surface 121. The outer end 141 of the threaded shank 131 is bifurcated to receive the brake shoe web 55 therebetween and hold the shank 131 against rotation (FIGS. 2 and 4). The nut 133 has its inner end 143 positioned to engage a shoulder 145 in the anchor block opening 129 and is normally held thereagainst by the force of the springs 126, 128. An antifriction ring 147 may be positioned between the nut 133 and the anchor block 127 to insure easy turning between these parts.

It will be seen that by turning the nut 133, the axial position of the shank 131 relative thereto and to the anchor block 127 is adjusted and the length of the anchor member 117 is varied. Specifically, by turning the nut 133 in a direction to move the shank 131 toward the right, as seen in FIGS. 2–4, the brake shoe 43 is adjusted radially outwardly toward the brake drum 23. The nut 133 is provided with a toothed wheel 149 which extends laterally beyond the anchor block 127. As is conventional, the nut 133 can be turned manually by inserting a tool through an opening (not shown) in the backing plate 25 and turning the toothed wheel 149. However, according to the present invention, the nut 133 is adapted to be turned automatically as the brake lining 51 wears to effect brake adjustment.

To this end, a lever 151 is pivotally mounted on the anchor block 127 by a pin 153 and has a projecting finger 157 positioned to interferingly engage the toothed wheel 149. A torsion spring 159 is positioned on the pin 153 and has one end 161 resting on top of the anchor block 127 and its other end 163 hooked in front of a projecting ear 165 on the lever 151. The lever 151 is biased in a counterclockwise direction as seen in FIG. 3 about the pin 153 by the torsion spring 159 but is normally held against turning in this direction by a generally C-shaped link 167 hooked around a lateral projection 169 on the lever 151 and around a spool 171 fixed to the torque resisting member 71 by a screw 173.

With the parts in position as shown in FIG. 3, the brakes are in the released or "off" condition and a bottom edge 175 of the lever finger 157 is positioned substantially above the midpoint of the toothed wheel 149. When the brakes are energized, the brake shoe 43 moves radially outwardly until the brake lining 51 contacts the brake drum 23. This causes the brake shoe web 55 and, through the springs 126, 128, the anchor block 127 also to move radially outwardly away from the anchor surface 121. Since the link 167 is hooked to both the spool 171 on the torque resisting member 71 and the lever 151, this movement of the anchor block 127 causes the lever 151 to swing in a clockwise direction about the pivot 153. The extent to which the lever 151 turns will be seen to be a function of the degree to which the brake lining 51 is worn.

In addition to radial brake shoe movement, frictional engagement between the drum 23 and the lining 51 causes the brake shoe 43 to move in the same direction the drum 23 is turning, which is in the direction of the arrow F when the vehicle is moving in a forward direction and in the direction of the arrow R when the vehicle is moving in the reverse direction When the vehicle is moving forwardly, these frictional forces move the brake shoe 43 and the anchor block 127 toward the anchor surface 121 and hold the anchor block surface 113 close to or engaged with the anchor surface 121 thereby maintaining a relative constant spacing between the pin 153 and the spool 171. Thus, even though the anchor block 127 has shifted radially outwardly relative to the torque resisting member, the lever 151 is not pivoted sufficiently relative to the anchor block 127 to turn the toothed wheel 149 and the screw 133.

When, however, the vehicle is traveling in the reverse direction, the brake drum 23 turns in the direction of the arrow R so that when the brake shoe 51 now contacts the brake drum 23, the brake shoe 43 also moves in the direction of the arrow R. This movement, together with the radial movement of the brake shoe acts through the springs 126, 128 and causes the anchor block 127 to move away from the spool 171. Since the link 167 is hooked to both the spool 171 and the lever 151, this anchor block movement causes the lever 151 to pivot in a clockwise direction about the pin 153.

The movement between the spool 171 and the pin 153 is minimal when the brake lining 51 is new but increases as the lining becomes worn until at some preselected point, the pivotal movement of the lever 151 is sufficient to impart turning movement to the screw 133 through engagement between the lever finger edge 175 and the toothed wheel 149. Thus, clockwise pivotal movement of the link 151 during brake energization while the vehicle is moving in reverse causes the finger edge 175 to bear downwardly on one of the teeth on the wheel 149 and turns the screw 133 in this direction. The resilient nature of the spring 159 acting on the lever 151 permits the lever to flex laterally to accommodate the arcuate configuration of the toothed wheel 149. When the brakes are deenergized, the brake shoe 43 returns toward its original position and the torsion spring 159 pivots the lever 151 in a counterclockwise direction back to its original position. Turning movement of the screw 133 is resisted by a spring clip 177 looped around the screw 133 and having its ends sandwiching the brake shoe web 55.

When the toothed wheel 149 turns a distance of one tooth under clockwise pivotal movement of the finger surface 175 on the lever 151, the spring clip 177 holds the screw 133 in this position. Thus, when the brakes are then released, counterclockwise movement of the lever 151 moves the lever finger 157 past one tooth and positions the finger edge 175 therebehind.

This turning movement of the screw 133 displaces the shank 131 axially toward the right, as seen in FIGS. 3 and 4, and elongates the anchor member 117 so that when the brake shoe 43 retracts under the force of the return springs 61, 63, its radial position will have been adjusted outwardly. If, for any reason, the screw 133 is not free to turn when the lever 151 engages the toothed wheel 149, the springs 126, 128 will stretch before either the link 167 or the lever 151 have been damaged.

It will be appreciated that although radial adjustment of the brake shoe 43, as well as the brake shoe 41, is effected initially only at the end thereof which carries the anchor members 117, 115, respectively, this radial adjustment is distributed equally to both ends of each shoe 41, 43 the next time the brakes are energized. This occurs by reason that the wheel cylinders 27, 29 are hydraulically interconnected by a conduit 179 so that equal pressures exist in the cylinders 27, 29 and equal forces will be applied to both ends of both brake shoes 41, 43. The floating nature of the brake shoes 41, 43 and the plungers 37, 39 which actuate them act to automatically reposition the shoes angularly immediately upon brake application. Thereafter, when the brake shoes 41, 43 are released, the return springs act equally on both ends of the brake shoes and position both ends thereof at uniform radial distances from the drum 23.

A modified form of the present invention is illustrated in FIGS. 8 and 9 and since the basic brake and wheel structure of this embodiment is the same as that of FIGS. 1–7, a detailed description thereof is omitted here, it being understood that like numerals refer to like parts in all the figures.

As shown in FIGS. 8 and 9, the link 167 connecting the lever 151 and the torque resisting member 71 has one end hooked to the lateral projection 169 on the lever 151 and its other end hooked to a modified spool 201 fixed to the member 71 by the screw 173. Unlike the spool 171 in the embodiment of FIGS. 1–7, the periphery of the spool 201 is eccentric relative to the screw 173 so that by angular adjustment of the spool 201, the angular position of the lever 151 when the brakes are off is adjusted. This permits accurate positioning of the edge 175 on the lever finger 157 relative to the toothed wheel 149 so that these parts do not need to be held to close tolerances during manufacture. In all other respects, the structure of this embodiment is the same as that of FIGS. 1–7.

By the foregoing, there has been disclosed an improved, automatic brake adjuster calculated to fulfill the inventive objects set forth, and while preferred embodiments of the present invention have been illustrated and described above in detail, various additions, substitutions, modifications and omissions may be made thereto without departing from the spirit of the invention as encompassed by the appended claims.

What is claimed is:

1. In a brake of the type having a rotatable brake drum, a fixed torque resisting means and a brake shoe within said drum engageable with said torque resisting means and movable into engagement with said drum, variable length means carried by said brake shoe and including first and second longitudinally adjustable members engaging said torque resisting means and said brake shoe, resilient means normally biasing one of said members toward said brake shoe, lever means carried by said one member and operatively engageable with the other of said members to adjust it longitudinally relative to said one member upon movement of said lever means a predetermined amount relative to said variable length means in one direction, link means interconnecting said lever means and said torque resisting member, said link means being operable to move said lever means in said one direction relative to said variable length means and oppose the biasing force of said resilient means to elongate said variable length means upon movement of sad brake shoe away from said torque resisting member.

2. A device as defined in claim 1 wherein said lever means is pivoted on said one member.

3. A device as defined in claim 1 wherein said resilient means includes tension spring means interconnecting said one member and said brake shoe.

4. A device as defined in claim 2 wherein said first member includes a block on which said lever means is pivoted and which is slidable in said brake shoe, said second member including a threaded shank adjustable longitudinally of said block and engageable with said brake shoe, said lever means operatively engaging said shank.

5. A device as defined in claim 4 which includes a nut threadedly receiving said shank and rotatably supported in and axially engaging said block, said lever engaging said nut and said shank nonrotatably engaging said brake shoe.

6. A device as defined in claim 5 wherein said nut includes a toothed wheel, said lever interferingly engageable with said wheel.

7. A device as defined in claim 1 wherein said link means is pivoted on said torque resisting means and said lever means.

8. A device as defined in claim 1 including means normally biasing said lever means in a direction opposite to said one direction, said link means operable to hold said lever means against movement in said opposite direction.

9. A device as defined in claim 7 wherein said link means includes a generally C-shaped member.

10. A device as defined in claim 8 including means for adjusting said link means and thereby the position of said lever means.

References Cited

UNITED STATES PATENTS 2,292,017  8/1942  Smith _____ 188—79.5
3,169,610  2/1965  Gold _____ 188—79.5

DUANE A. REGER, *Primary Examiner.*